United States Patent
Nemet

(10) Patent No.: US 9,122,963 B2
(45) Date of Patent: *Sep. 1, 2015

(54) TAMPER-PROOF QUALITY MANAGEMENT BARCODE INDICATORS

(71) Applicant: VARCODE LTD., Rosh Ha'ain (IL)

(72) Inventor: Yaron Nemet, Kedumim (IL)

(73) Assignee: Varcode Ltd., Rosh Ha'ayin, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/461,778

(22) Filed: Aug. 18, 2014

(65) Prior Publication Data

US 2014/0353385 A1    Dec. 4, 2014

Related U.S. Application Data

(63) Continuation of application No. 13/657,185, filed on Oct. 22, 2012, now Pat. No. 8,807,422.

(51) Int. Cl.
G06F 7/00 (2006.01)
G06K 19/06 (2006.01)
G01D 7/00 (2006.01)

(52) U.S. Cl.
CPC .......... *G06K 19/06028* (2013.01); *G01D 7/005* (2013.01); *G06K 19/06046* (2013.01)

(58) Field of Classification Search
USPC ........................................................ 235/375
See application file for complete search history.

(56) References Cited

U.S. PATENT DOCUMENTS

| 7,166,345 | B2 * | 1/2007 | Myers et al. | 428/42.3 |
| 8,807,422 | B2 * | 8/2014 | Nemet | 235/375 |
| 2009/0302102 | A1 * | 12/2009 | Nemet et al. | 235/376 |

* cited by examiner

Primary Examiner — Christle I Marshall
(74) Attorney, Agent, or Firm — Fish & Richardson P.C.

(57) ABSTRACT

A tamper-proof barcoded quality indicator operative to provide a machine-readable indication of exceedance of time and temperature thresholds following actuation thereof, including a first barcode including a first colorable area and being machine-readable before exceedance of the time and temperature thresholds, a second barcode including a second colorable area and not being machine-readable before exceedance of the time and temperature thresholds, a coloring agent located at a first location on the indicator, a coloring agent pathway operative to allow the coloring agent to move, at a rate which is at least partially a function of time, from the first location to the first and second colorable areas simultaneously for simultaneous coloring thereof upon exceedance of the time and temperature thresholds, thereby causing the first barcode to become unreadable and at the same time causing the second barcode to become machine-readable, and a tamper-proof actuator element operative to actuate the indicator.

7 Claims, 4 Drawing Sheets

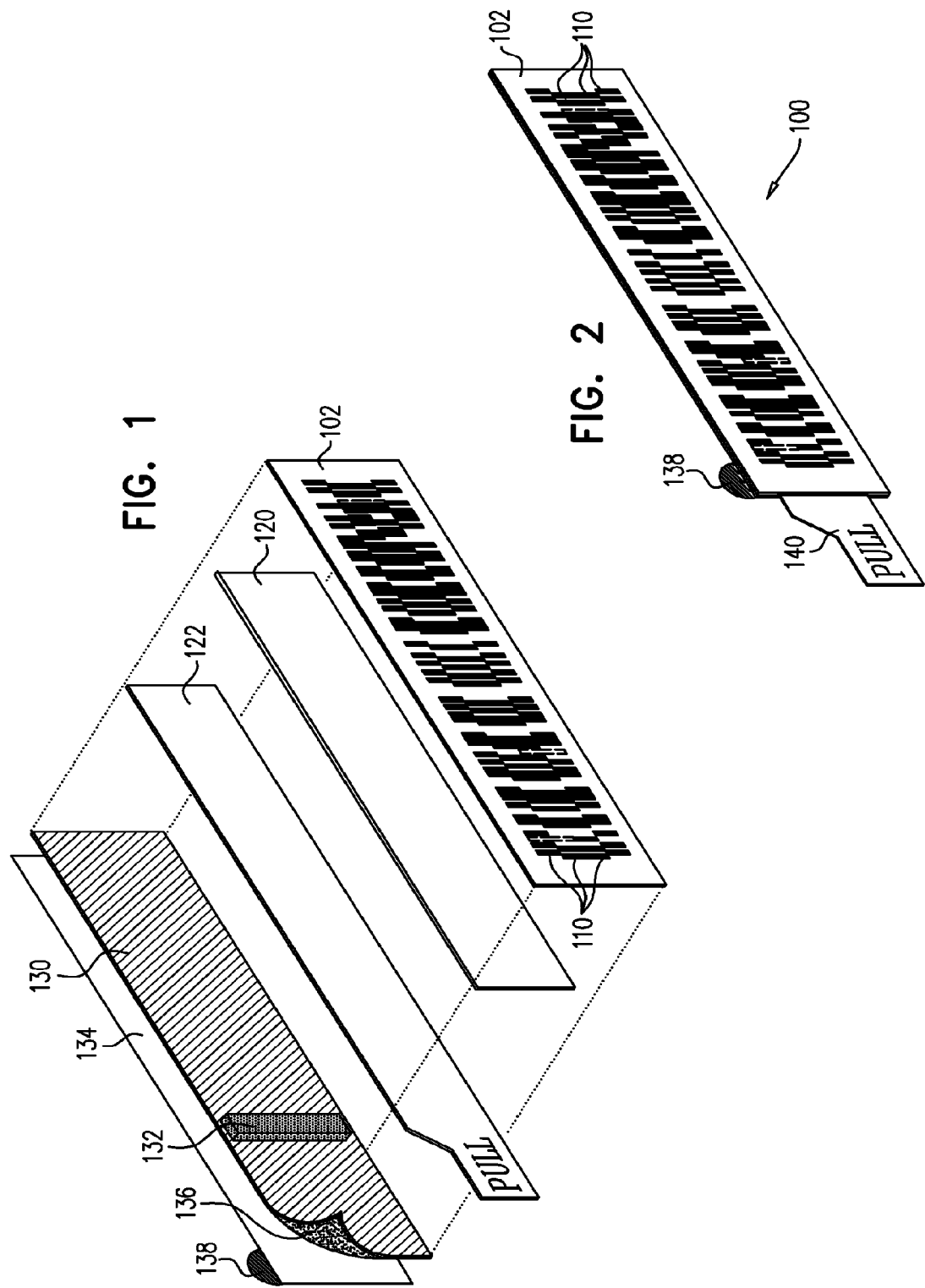

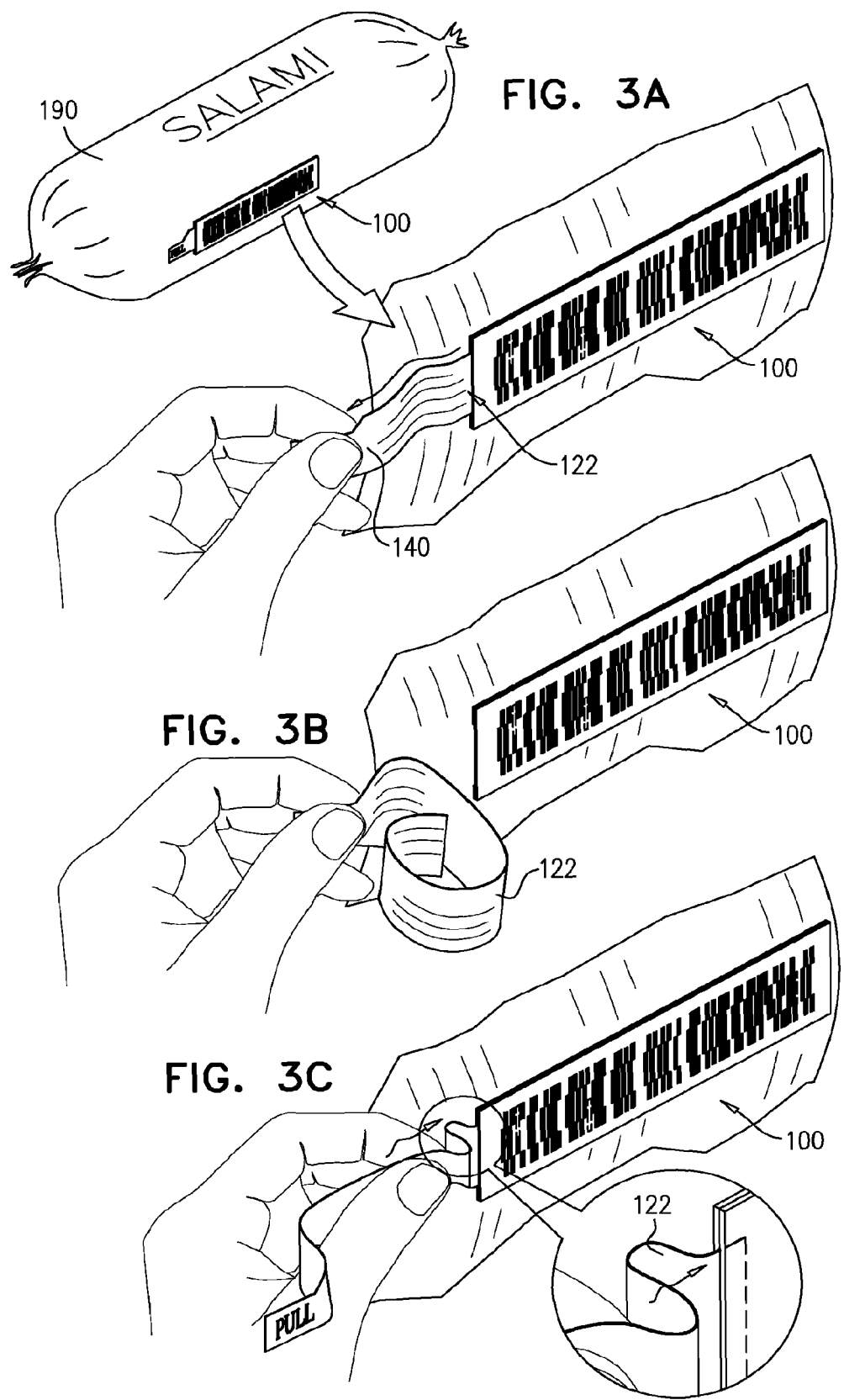

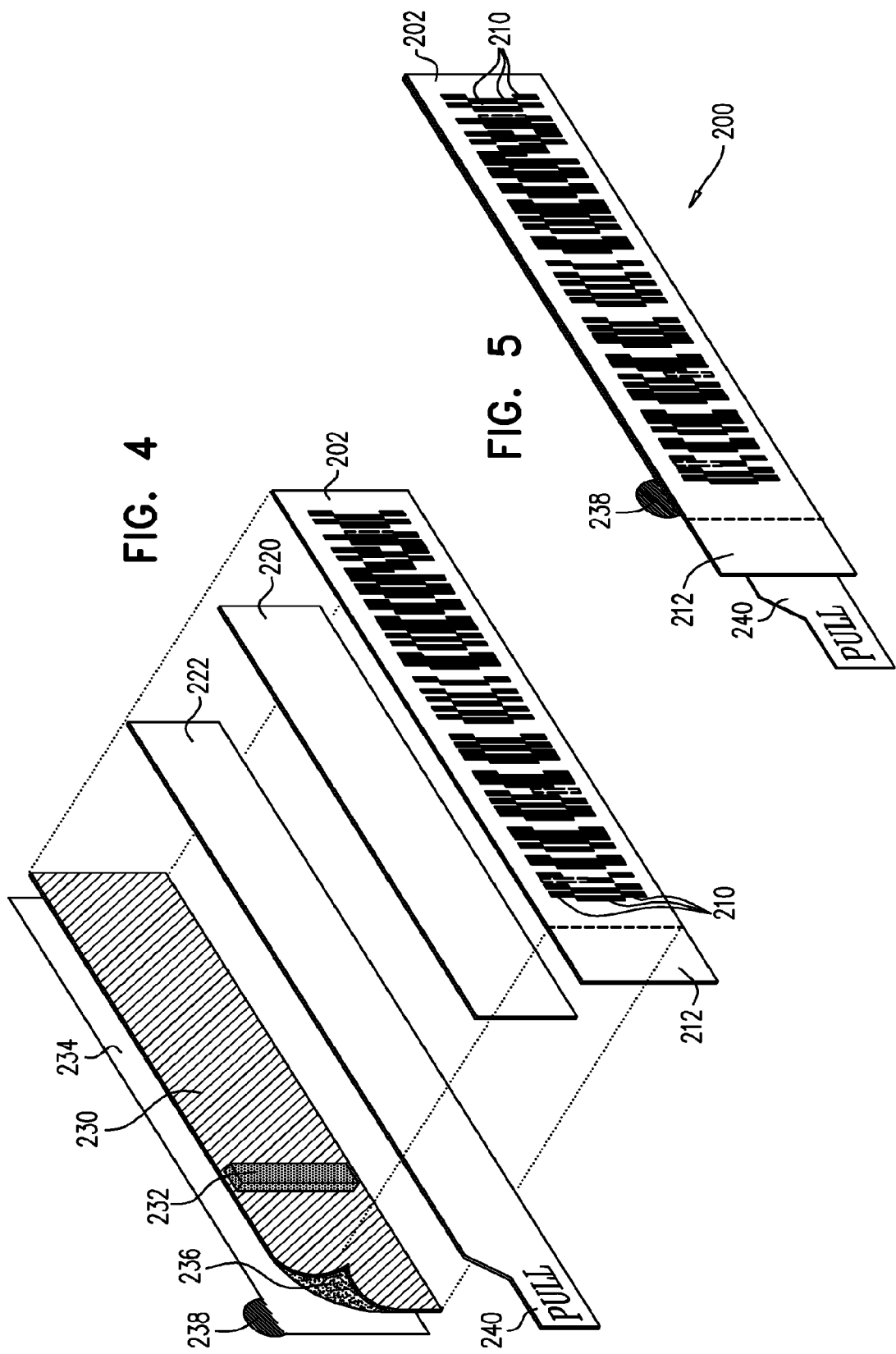

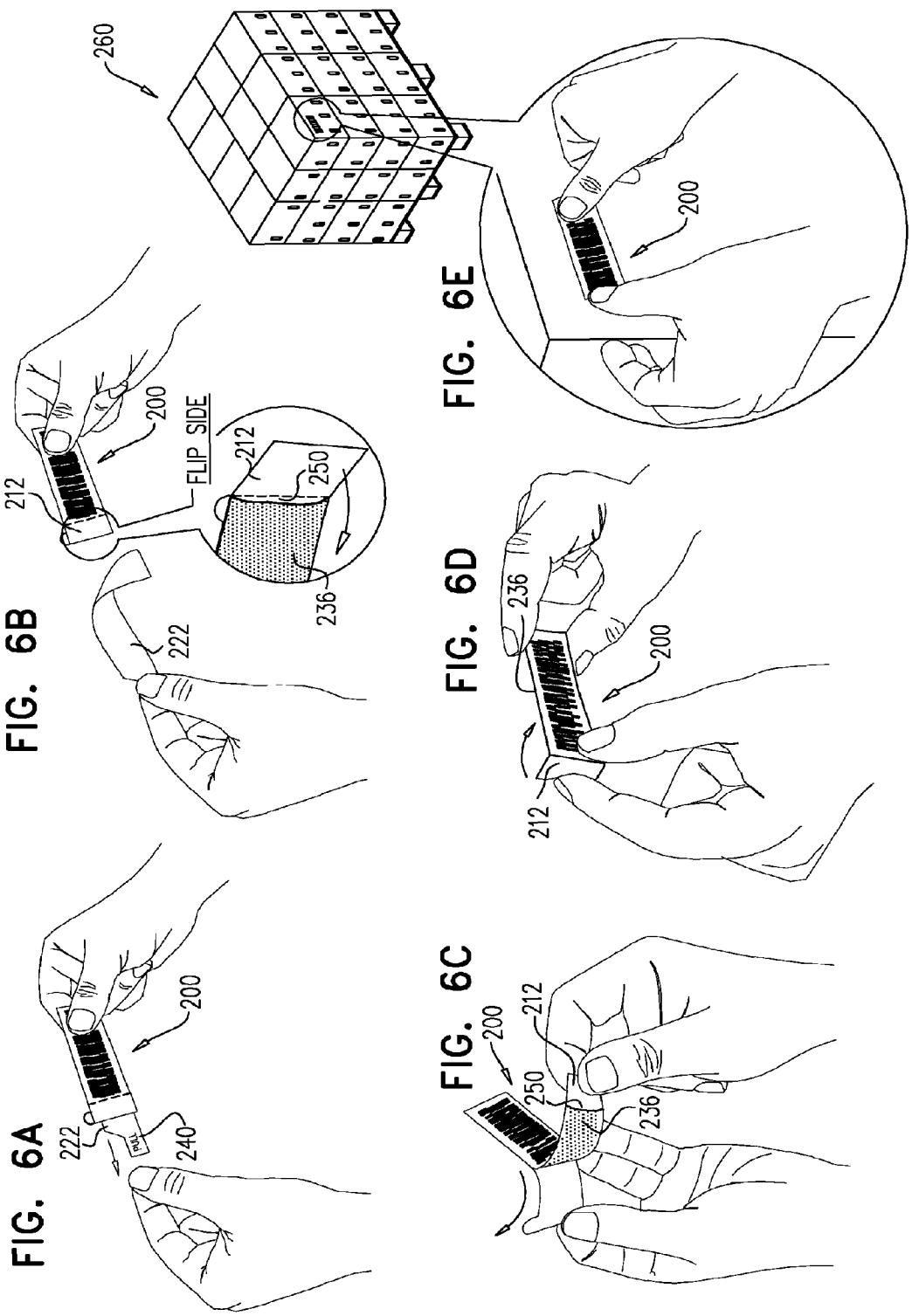

TAMPER-PROOF QUALITY MANAGEMENT BARCODE INDICATORS

REFERENCE TO RELATED APPLICATIONS

Reference is made to the following patent and patent application, owned by assignee, the disclosures of which are hereby incorporated by reference:

U.S. Pat. Nos. 7,562,811 and 8,091,776; and

U.S. Published Patent Application Nos.: 2009/0230182; 2010/0219235; 2011/0006109 and 2011/0006115; and U.S. patent application Ser. Nos. 13/321,467; 13/321,477 and 13/323,906.

FIELD OF THE INVENTION

The present invention relates to tamper-proof quality management barcode indicators.

BACKGROUND OF THE INVENTION

The following publications are believed to represent the current state of the art:

U.S. Pat. Nos. 5,805,245; 6,009,400; 6,685,094; 6,758,397; 7,562,811; 8,091,776 and RE 39,266; and U.S. Published Patent Application Nos.: 2009/0230182, 2010/0219235, 2011/0006109 and 2011/0006115.

SUMMARY OF THE INVENTION

The present invention seeks to provide tamper-proof quality management barcode indicators.

There is thus provided in accordance with a preferred embodiment of the present invention a tamper-proof barcoded quality indicator operative to provide a machine-readable indication of exceedance of at least one time and temperature threshold following actuation thereof, the indicator including a first barcode including at least one first colorable area, the first barcode being machine-readable before exceedance of the at least one time and temperature threshold, at least a second barcode including at least one second colorable area, the second barcode not being machine-readable before exceedance of the at least one time and temperature threshold, a coloring agent located at a first location on the indicator, a coloring agent pathway operative, following actuation of said quality indicator, to allow the coloring agent to move, at a rate which is at least partially a function of time, from the first location to the first and second colorable areas simultaneously for simultaneous coloring thereof upon exceedance of the time and temperature threshold, thereby causing the first barcode to become unreadable and at the same time causing the second barcode to become machine-readable, and a tamper-proof actuator element operative to actuate the quality indicator upon removal thereof from said quality indicator.

Preferably, the tamper-proof actuator element is disposed between the coloring agent and the coloring agent pathway prior to actuation of the quality indicator, thereby preventing passage of the coloring agent to the coloring agent pathway. Preferably, the tamper-proof actuator element is formed of a thin flexible material. Preferably, the tamper-proof actuator element includes a pullable actuator tab which protrudes from the quality indicator prior to actuation of the tamper-proof barcoded quality indicator. Preferably, the actuation of the quality indicator includes irreversibly removing the tamper-proof actuator element from the quality indicator, thereby irreversibly enabling passage of the coloring agent to the coloring agent pathway.

Preferably, the quality indicator also includes a release layer which is adhered to an adhesive back surface of the quality indicator. Preferably, removal of the release layer is operative to expose the adhesive back surface which is operable for adhering the quality indicator to a product for which quality is to be monitored. Preferably, the release layer includes a release tab operable for enabling release of the release layer from the adhesive back surface.

There is also provided in accordance with another preferred embodiment of the present invention a barcoded quality indicator operative to provide a machine-readable indication of exceedance of at least one time and temperature threshold following actuation thereof, the indicator including a first barcode including at least one first colorable area, the first barcode being machine-readable before exceedance of the at least one time and temperature threshold, at least a second barcode including at least one second colorable area, the second barcode not being machine-readable before exceedance of the at least one time and temperature threshold, a coloring agent located at a first location on the indicator, a coloring agent pathway operative, following actuation of said quality indicator, to allow the coloring agent to move, at a rate which is at least partially a function of time, from the first location to the first and second colorable areas simultaneously for simultaneous coloring thereof upon exceedance of the time and temperature threshold, thereby causing the first barcode to become unreadable and at the same time causing the second barcode to become machine-readable, an actuator element operative to actuate the quality indicator upon removal thereof from said quality indicator, and a sealing element operative to seal the coloring agent pathway subsequent to removal of the actuator element.

Preferably, the actuator element is disposed between the coloring agent and the coloring agent pathway prior to actuation of the quality indicator, thereby preventing passage of the coloring agent to the coloring agent pathway. Preferably, the actuator element includes a pullable actuator tab which protrudes from the quality indicator prior to actuation of the barcoded quality indicator. Preferably, the actuation of the quality indicator includes irreversibly removing the actuator element from the quality indicator, thereby irreversibly enabling passage of the coloring agent to the coloring agent pathway.

Preferably, the quality indicator also includes a release layer which is adhered to an adhesive back surface of the quality indicator. Preferably, removal of the release layer is operative to expose the adhesive back surface which is operable for adhering the quality indicator to a product for which quality is to be monitored. Preferably, the release layer includes a release tab operable for enabling release of the release layer from the adhesive back surface.

Preferably, the sealing element includes a sealing tab operable for foldable sealing of the coloring agent pathway. Preferably, the sealing tab is operable for selectable adherence to the adhesive back surface, thereby sealing the coloring agent pathway.

BRIEF DESCRIPTION OF THE DRAWINGS

The present invention will be understood more fully from the following detailed description, taken in conjunction with the drawings in which:

FIG. 1 is a simplified illustration of the structure of a tamper-proof barcoded quality indicator, constructed and operative in accordance with a preferred embodiment of the present invention;

FIG. 2 is a simplified illustration of the assembled tamper-proof barcoded quality indicator of FIG. 1;

FIGS. 3A, 3B and 3C are simplified pictorial illustrations of steps in the actuation of the tamper-proof barcoded quality indicator of FIGS. 1 and 2;

FIG. 4 is a simplified illustration of the structure of a barcoded quality indicator, constructed and operative in accordance with another preferred embodiment of the present invention;

FIG. 5 is a simplified illustration of the assembled barcoded quality indicator of FIG. 4; and FIGS. 6A, 6B, 6C, 6D and 6E are simplified pictorial illustrations of steps in the actuation of the barcoded quality indicator of FIGS. 4 and 5.

DETAILED DESCRIPTION OF A PREFERRED EMBODIMENT

Reference is now made to FIG. 1, which is a simplified illustration of the structure of a tamper-proof barcoded quality indicator, constructed and operative in accordance with a preferred embodiment of the present invention, and to FIG. 2, which is a simplified illustration of the assembled tamper-proof barcoded quality indicator of FIG. 1.

The tamper-proof barcoded quality indicator of FIGS. 1 & 2 is preferably operative to provide a machine-readable indication of exceedance of at least one time and temperature threshold following actuation thereof, and includes a first barcode including at least one first colorable area, the first barcode being machine-readable before exceedance of the at least one time and temperature threshold and at least a second barcode including at least one second colorable area, the second barcode not being machine-readable before exceedance of the at least one time and temperature threshold.

Preferably, the indicator also includes a coloring agent located at a first location on the indicator and a coloring agent pathway operative to allow the coloring agent to move, at a rate which is at least partially a function of time, from the first location to the first and second colorable areas simultaneously for simultaneous coloring thereof upon exceedance of the time and temperature threshold, thereby causing the first barcode to become unreadable and at the same time causing the second barcode to become machine-readable.

A system and method for quality management which utilizes the barcoded quality indicator of FIGS. 1 & 2 is clearly described, inter alia, in U.S. Pat. No. 8,091,776 of the applicant, which is incorporated herein by reference.

It is a particular feature of this embodiment of the present invention that the tamper-proof barcoded quality indicator of FIG. 1 also includes a tamper-proof actuator element operative to prevent passage of the coloring agent to the coloring agent pathway prior to removal thereof, and to irreversibly enable passage of the coloring agent to the coloring agent pathway following removal thereof.

As shown in FIGS. 1 & 2, tamper-proof barcoded quality indicator 100 preferably includes a barcode defining layer 102 having a multiplicity of barcodes 110 printed thereupon. Barcode defining layer 102 is preferably formed of a transparent substrate.

A coloring agent pathway 120 is preferably disposed behind barcode defining layer 102. A tamper-proof actuator pull strip 122 is preferably disposed between coloring agent pathway 120 and a back layer 130 having a coloring element 132 mounted thereupon, which coloring element 132 preferably contains coloring agents. Tamper-proof actuator pull strip 122 preferably prevents the passage therethrough of coloring agents from coloring element 132 to coloring agent pathway 120 when quality indicator 100 in a pre-actuated state.

A release layer 134 is preferably adhered to an adhesive back surface 136 of back layer 130. Removal of release layer is operative to expose adhesive back surface 136 which is operable for adhering quality indicator 100 to a product for which quality is to be monitored. Release layer 140 preferably includes a release tab 138 operable for easy release of release layer 140 from back surface 142.

FIG. 2 illustrates tamper-proof barcoded quality indicator 100 in an assembled, pre-actuated state. As shown particularly in FIG. 2, an actuator tab 140 of tamper-proof actuator pull strip 122 preferably protrudes from quality indicator 100, between coloring agent pathway 120 and back layer 130.

Reference is now made to FIGS. 3A, 3B and 3C, which are simplified pictorial illustrations of steps in the actuation of the tamper-proof barcoded quality indicator of FIGS. 1 & 2. As shown in FIGS. 3A-3C, after affixing tamper-proof barcoded quality indicator 100 to a product 190, indicator 100 is actuated by pulling on actuator tab 140 of tamper-proof actuator pull strip 122 and removing tamper-proof actuator pull strip 122 from between coloring agent pathway 120 and back layer 130. It is appreciated that removal of tamper-proof actuator pull strip 122 from between coloring agent pathway 120 and back layer 130 allows the passage of coloring agents contained in coloring element 132 to coloring agent pathway 120, thereby actuating proof barcoded quality indicator 100.

It is appreciated that tamper-proof actuator pull strip 122 is formed of a flexible material, such as a thin paper. Therefore, as shown in particular in FIG. 3C, it is a particular feature of this embodiment of the present invention that once removed from between coloring agent pathway 120 and back layer 130, tamper-proof actuator pull strip 122 cannot be re-inserted between coloring agent pathway 120 and back layer 130 due to the flexible nature of tamper-proof actuator pull strip 122, thereby preventing indicator 100 from returning to a pre-actuated state.

Reference is now made to FIG. 4, which is a simplified illustration of the structure of a barcoded quality indicator, constructed and operative in accordance with another preferred embodiment of the present invention, and to FIG. 5, which is a simplified illustration of the assembled barcoded quality indicator of FIG. 4.

The barcoded quality indicator of FIGS. 4 & 5 is preferably operative to provide a machine-readable indication of exceedance of at least one time and temperature threshold following actuation thereof, and includes a first barcode including at least one first colorable area, the first barcode being machine-readable before exceedance of the at least one time and temperature threshold and at least a second barcode including at least one second colorable area, the second barcode not being machine-readable before exceedance of the at least one time and temperature threshold.

Preferably, the indicator also includes a coloring agent located at a first location on the indicator and a coloring agent pathway operative to allow the coloring agent to move, at a rate which is at least partially a function of time, from the first location to the first and second colorable areas simultaneously for simultaneous coloring thereof upon exceedance of the time and temperature threshold, thereby causing the first barcode to become unreadable and at the same time causing the second barcode to become machine-readable.

A system and method for quality management which utilizes the barcoded quality indicator of FIGS. 4 & 5 is clearly described, inter alia, in U.S. Pat. No. 8,091,776 of the applicant, which is incorporated herein by reference.

Preferably, the barcoded quality indicator of FIGS. 4 and 5 also includes an actuator element operative to prevent passage of the coloring agent to the coloring agent pathway prior to removal thereof, and to irreversibly enable passage of the coloring agent to the coloring agent pathway following removal thereof.

It is a particular feature of this embodiment of the present invention that the barcoded quality indicator of FIGS. 4 and 5 also includes a sealing element operative to seal the coloring agent pathway subsequent to removal of the actuator element.

As shown in FIGS. 4 & 5, barcoded quality indicator 200 preferably includes a barcode defining layer 202 having a multiplicity of barcodes 210 printed thereupon. Barcode defining layer 202 is preferably formed of a transparent substrate, and is preferably formed with a foldable sealing tab 212.

A coloring agent pathway 220 is preferably disposed behind barcode defining layer 202. An actuator pull strip 222 is preferably disposed between coloring agent pathway 220 and a back layer 230 having a coloring element 232 mounted thereupon, which coloring element 232 preferably contains coloring agents. Actuator pull strip 222 preferably prevents the passage therethrough of coloring agents from coloring element 232 to coloring agent pathway 220 when quality indicator 200 in a pre-actuated state.

A release layer 234 is preferably adhered to an adhesive back surface 236 of back layer 230. Removal of release layer is operative to expose adhesive back surface 236 which is operable for adhering quality indicator 200 to a product for which quality is to be monitored. Release layer 234 preferably includes a release tab 238 operable for easy release of release layer 234 from back surface 236.

FIG. 5 illustrates barcoded quality indicator 200 in an assembled, pre-actuated state. As shown particularly in FIG. 5, an actuator tab 240 of actuator pull strip 222 preferably protrudes from quality indicator 200, between coloring agent pathway 220 and back layer 230.

Reference is now made to FIGS. 6A, 6B, 6C, 6D and 6E, which are simplified pictorial illustrations of steps in the actuation of the barcoded quality indicator of FIGS. 4 and 5. As shown in FIGS. 6A & 6B, indicator 200 is actuated by pulling on actuator tab 240 of actuator pull strip 222 and removing actuator pull strip 222 from between coloring agent pathway 220 and back layer 230. It is appreciated that removal of actuator pull strip 222 from between coloring agent pathway 220 and back layer 230 allows the passage of coloring agents contained in coloring element 232 to coloring agent pathway 220, thereby actuating proof barcoded quality indicator 200. It is also appreciated that removal of actuator pull strip 222 from between coloring agent pathway 220 and back layer 230 is operative to expose an open slit 250 formed between coloring agent pathway 220 and back layer 230.

Thereafter, as shown in FIG. 6C, release layer 234 is removed from adhesive back surface 236, thereby exposing adhesive back surface 236 which is operable for adhering quality indicator 200 to a pallet of produce 260 for which quality is to be monitored. Thereafter, as shown in FIG. 6D, slit 250 is sealed by folding foldable sealing tab 212 over slit 250 and adhering tab 212 to adhesive back surface 236.

It is a particular feature of this embodiment of the present invention that sealing of slit 250 by folding sealing tab 212 over slit 250 onto adhesive back surface 236 is operative to prevent environmental elements, such as moisture, from entering slit 250. It is appreciated that entry of moisture into slit 250 may damage, for example, any one of barcode defining layer 202, barcodes 210, and coloring agents contained in coloring element 232 or located in coloring agent pathway 220, thereby rendering quality indicator 200 inaccurate.

As shown in FIG. 6E, after sealing of slit 250, indicator 200 is adhered to pallet 260.

It will be appreciated by persons skilled in the art that the present invention is not limited by what has been particularly shown and described hereinabove. Rather the scope of the present invention includes both combinations and subcombinations of various features described hereinabove and variations and modifications thereof which would occur to persons skilled in the art upon reading the foregoing, which are not in the prior art.

The invention claimed is:

1. A barcoded quality indicator operative to provide a machine-readable indication of exceedance of at least one time and temperature threshold following actuation thereof, said indicator comprising:
    a first barcode including at least one first colorable area, said first barcode being machine-readable before exceedance of said at least one time and temperature threshold;
    at least a second barcode including at least one second colorable area, said second barcode not being machine-readable before exceedance of said at least one time and temperature threshold;
    a coloring agent located at a first location on said indicator;
    a coloring agent pathway operative, following actuation of said quality indicator, to allow said coloring agent to move, at a rate which is at least partially a function of time, from said first location to said first and second colorable areas simultaneously for simultaneous coloring thereof upon exceedance of said time and temperature threshold, thereby causing said first barcode to become unreadable and at the same time causing said second barcode to become machine-readable;
    an actuator element operative to actuate said quality indicator upon removal thereof from said quality indicator; and
    a sealing element operative to seal said coloring agent pathway subsequent to removal of said actuator element, said sealing element comprising a foldable sealing tab operative to prevent damage to said barcoded quality indicator.

2. A barcoded quality indicator according to claim 1 and wherein said actuator element is disposed between said coloring agent and said coloring agent pathway prior to actuation of said quality indicator, thereby preventing passage of said coloring agent to said coloring agent pathway.

3. A barcoded quality indicator according to claim 1 and wherein said actuator element comprises a pullable actuator tab which protrudes from said quality indicator prior to actuation of said barcoded quality indicator.

4. A barcoded quality indicator according to claim 1 and wherein said actuation of said quality indicator comprises irreversibly removing said actuator element from said quality indicator, thereby irreversibly enabling passage of said coloring agent to said coloring agent pathway.

5. A tamper-proof barcoded quality indicator according to claim 1 and wherein said quality indicator also comprises a release layer which is adhered to an adhesive back surface of said quality indicator.

6. A tamper-proof barcoded quality indicator according to claim 5 and wherein removal of said release layer is operative to expose said adhesive back surface which is operable for adhering said quality indicator to a product for which quality is to be monitored.

7. A tamper-proof barcoded quality indicator according to claim 5 and wherein said release layer comprises a release tab operable for enabling release of said release layer from said adhesive back surface.

\* \* \* \* \*